(12) United States Patent
Yamauchi et al.

(10) Patent No.: US 6,590,849 B1
(45) Date of Patent: Jul. 8, 2003

(54) DISK DRIVE APPARATUS

(75) Inventors: Yoshiaki Yamauchi, Minori (JP); Hisahiro Miki, Chigasaki (JP); Seiji Hamaie, Hitachinaka (JP); Tomoki Hirata, Yokohama (JP); Shinsuke Takatsuka, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/520,724

(22) Filed: Mar. 8, 2000

(30) Foreign Application Priority Data

Mar. 31, 1999 (JP) .......................................... 11-092426

(51) Int. Cl.⁷ .............................................. G11B 33/02
(52) U.S. Cl. .................................................. 369/77.1
(58) Field of Search ................................ 369/77.1, 75.1, 369/75.2; 360/291.2; 74/89.14

(56) References Cited

U.S. PATENT DOCUMENTS

| | | | | |
|---|---|---|---|---|
| 4,700,251 A | * | 10/1987 | Fuke et al. ................. | 360/106 |
| 4,729,250 A | * | 3/1988 | Ikeda et al. ................ | 74/89.15 |
| 5,414,578 A | * | 5/1995 | Lian et al. .................. | 360/106 |
| 5,537,275 A | * | 7/1996 | Peace et al. ................ | 360/106 |
| 5,636,198 A | * | 6/1997 | Maeng ....................... | 369/191 |
| 5,731,373 A | * | 3/1998 | Hirose et al. .............. | 524/447 |
| 5,811,903 A | * | 9/1998 | Ueno et al. ................. | 310/90 |
| 5,886,438 A | * | 3/1999 | Kawanishi .................. | 310/90 |
| 5,959,956 A | * | 9/1999 | Takishima .................. | 369/75.2 |
| 5,995,468 A | * | 11/1999 | Furukawa ................... | 369/77.1 |
| 6,058,090 A | * | 5/2000 | Wang et al. ................ | 369/77.1 |
| 6,145,538 A | * | 11/2000 | Park ........................... | 137/554 |
| 6,166,889 A | * | 12/2000 | Aoki .......................... | 360/267.7 |
| 6,208,606 B1 | * | 3/2001 | Saito .......................... | 369/77.1 |
| 6,233,216 B1 | * | 5/2001 | Kang et al. ................. | 369/77.1 |
| 6,339,575 B1 | * | 1/2002 | Suzuki ....................... | 369/77.1 |

FOREIGN PATENT DOCUMENTS

JP  10-283704  10/1998

* cited by examiner

Primary Examiner—William Korzuch
Assistant Examiner—Angel Castro
(74) Attorney, Agent, or Firm—Antonelli, Terry, Stout & Kraus, LLP

(57) ABSTRACT

In the case when a disk is transported into or out of an apparatus, local contact noise is generated in a drive transmission gear and a clutch portion of a disk loading mechanism. Also, this phenomenon gives rise to problems relating to damage of parts, life of a loading motor and the like. Thus, a disk loading mechanism is provided to perform two operations of driving a disk tray in a disk transportation direction by means of a loading motor provided with a worm gear, via a first wheel gear and a second wheel gear, and also vertically raising and lowering a unit mechanism via a slide plate. In addition, a unit for controlling whirling of the above worm gear is provided to reduce contact noise of the gear and clutch portion and improve the reliability of a disk drive apparatus.

5 Claims, 5 Drawing Sheets

DISK DRIVE APPARATUS

BACKGROUND OF THE INVENTION

The present invention relates to a disk drive apparatus that performs reproducing or reproducing/recording of information by rotating a circular plate-like disk which is a recording medium, and relates in particular to a loading mechanism for CD-ROM, DVD-ROM, DVD-RAM, etc.

A disk loading mechanism that performs operations that transport the disk constituting the recording medium into or out of the apparatus, and after transporting the disk into the apparatus, performs an operation that positions the reproduce/record head, which reproduces information on the disk or records information, in the prescribed state, is an extremely important mechanical element in a disk drive apparatus. This loading mechanism may have a configuration whereby the driving force is transmitted by means of a combination of a plurality of gears or rubber rings, as described in JP-A-10-283704.

The disk loading mechanism of a disk drive apparatus is required to perform operations that transport the disk into or out of the apparatus; and, when the disk is transported into the apparatus, an operation that raises and lowers the unit mechanism movable entity comprising an optical head, spindle motor, unit mechanism chassis, and unit holder, vertically within the apparatus, in order to fix the disk to the spindle motor; or, when the disk is transported out of the apparatus, an operation that raises and lowers the unit mechanism vertically within the apparatus is required, in order to detach the disk from the spindle motor. Also, for reasons of cost reduction, these operations are performed by a single rotary drive motor. Therefore, a plurality of gear conversions are used as the driving force transmission mechanism for performing each operation, and the configuration is extremely complex. Further, when the driving force is transmitted by means of a wheel gear or worm gear fixed to the rotating shaft of the rotary drive motor, and another wheel gear or a rack, contact noise is generated by the backlash which always exists in the meshing parts of the gears. In addition, as the above described rotating shaft of the rotary drive motor is placed in a cantilever state, whirling occurs at the tip of the shaft. As a result of this whirling of the shaft, the contact noise between gears due to backlash increases further.

SUMMARY OF THE INVENTION

The present invention is intended to solve these kinds of problems, and its objects is to design a reduction of the contact noise generated in the disk loading mechanism that performs transmission of a driving force by means of a rotary drive motor and a plurality of gears and a rack, between the above described gears and rack when the disk is transported into the apparatus, and provide a high-grade disk drive apparatus.

In order to solve the above described problems, one rotary drive motor is used in the disk loading mechanism, a worm gear is attached to the rotating shaft of this motor, and a disk loading operation is performed via another gear meshing with the above described worm gear, a mechanism that controls shaft whirling is provided on the rotating shaft, a first wheel gear and a second wheel gear are provided at two upper and lower levels, and a disk loading mechanism is used that performs disk tray inward-transportation operations by means of a rack provided on the disk tray via these gears, and operations to move up and down the movable entity comprising an optical head, spindle motor, unit mechanism chassis, and unit holder, that performs reproducing of information on the disk, or recording and reproducing, via a slide plate from the above described worm gear, by centrally rotating a rotary shaft provided on the above described unit holder.

A disk loading mechanism is provided wherein the helix angle of the above described worm gear is in a range from 50 degrees to 80 degrees.

Further, the shape of the above described supporting portion (bearing) provided on the structure that supports the tip of the worm gear attached to the above described rotary drive motor shaft is a V-shaped groove or conical groove with respect to the above described gear rotation center.

PREFERRED EMBODIMENTS OF THE INVENTION

With reference now to FIGS. 1 to 6, an embodiment of the present invention will be described below.

Figure 1:
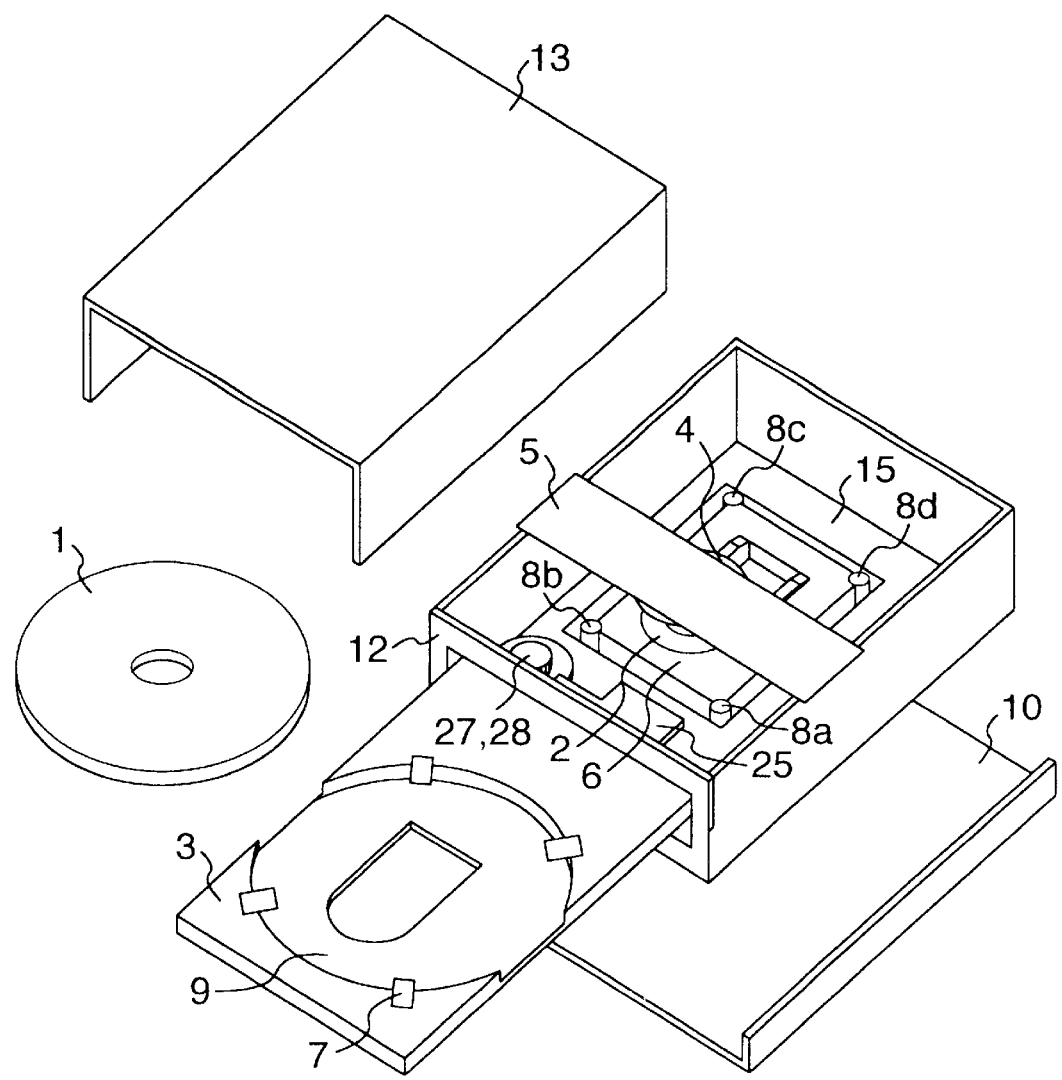
FIG. 1 is a schematic view of a disk drive apparatus using an embodiment of the present invention.

FIG. 1 shows an exploded perspective view of a disk drive apparatus using an embodiment of the present invention, and a disk 1 serving as a recording medium.

The disk drive apparatus is provided with a disk loading mechanism having the disk 1, which is a circular plate-like recording medium, attached to a spindle motor 2, and establish the state in which the information on the disk 1 is reproduced. The disk loading mechanism comprises a disk tray 3, a loading motor and a gear fitted to the rotating shaft of the motor which are not shown, a slide plate 25 and a slide plate rack 26 provided on the slide plate 25, wheel gears 27 and 28, and the like. In order to transport the disk 1 into or out of the apparatus, the disk loading mechanism performs operations whereby the disk tray 3 that carries the disk 1 during transportation is inserted and extracted through an insertion/extraction opening provided in the front panel 12 of the apparatus. Further, in order to place the disk 1 that has been transported into the apparatus onto the turntable of the spindle motor 2, and to fix the disk 1 by means of the disk clamper 4, which is attached to a clamper holder 5, the disk loading mechanism integrally raises and lowers the spindle motor 2, an optical head 11 that reproduces or records and reproduces information of the disk 1, and a unit mechanism chassis 6 that supports this.

Details of these operations and the actual configuration will be given later. When the disk 1 is fixed to the spindle motor 2, the spindle motor 2 starts rotating at the prescribed rotation speed. When the rotation of the disk 1 reaches the prescribed rotation speed, data recorded on the disk 1 is read, or data writing to the disk 1 is performed, by means of the optical head 11 provided on the unit mechanism chassis 6. The optical head is attached to an optical head drive mechanism that can move in the radial direction of the disk 1. The spindle motor 2 and the optical head drive mechanism are mounted on the unit mechanism chassis 6. Vibrations and shocks transmitted to the unit mechanism chassis 6 from outside the apparatus are attenuated by means of insulators 8a to 8d (elastic entities). The unit mechanism chassis 6 is attached to the unit holder (not shown) via these insulators 8a to 8d. Also, the above described unit holder is attached to the mechanism base section. The disk drive apparatus is configured so as to be incorporated into a computer apparatus, etc., with these mechanisms attached to a bottom cover 10 and a top cover 13.

As explained above, the loading mechanism performs transmission of the driving force by means of a mechanical system. To be specific, the force is transmitted by means of a plurality of gears. As a result, problems arise such as contact vibration due to the contact conditions between the gears, and noise due to contact, or damage to or reduced life of portions in contact. The present invention proposes a loading mechanism to solve such problems.

Figure 2:
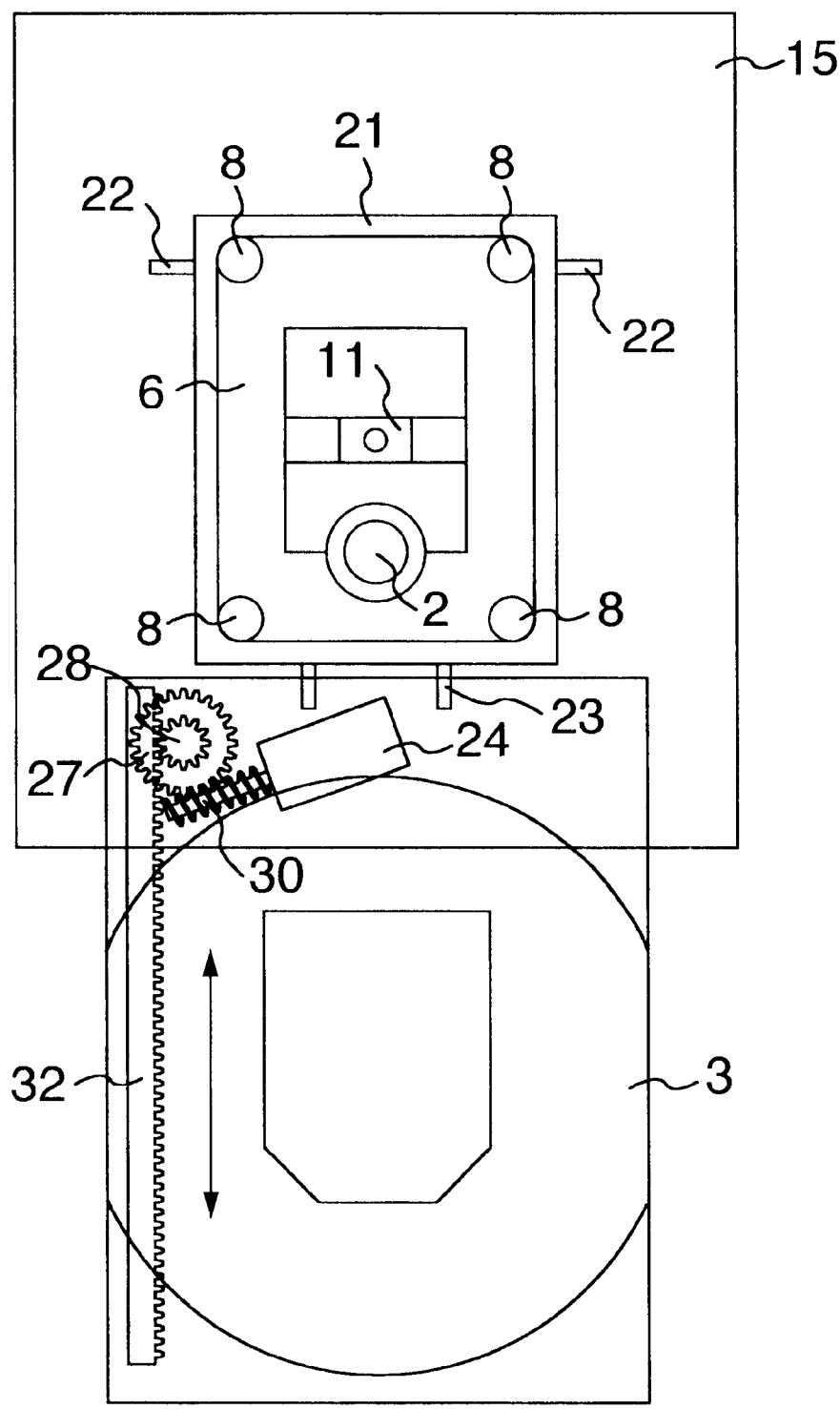
FIG. 2 is an illustration of a disk tray carrying-in and -out operation by means of a disk loading mechanism of the present invention.

The loading mechanism of the disk drive apparatus using an embodiment of the present invention will be explained below. FIG. 2 is a drawing showing the unit mechanism and loading mechanism viewed from the top of the disk drive apparatus in order to explain the inward and outward transportation operations of the disk tray 3 by means of the disk loading mechanism that is an embodiment of the present invention.

Inward and outward transportation of the disk tray 3 is performed using the rotary driving force of the loading motor 24 of the disk loading mechanism. The loading motor 24 is positioned by means of a fixed positioning pin provided on the mechanism base 15 (not illustrated), and the body of a loading motor 24 is fixedly engaged by one or more pinching structures outward transportation described before, the gears will not move and in some cases there is a possibility of damaging a gear section.

Thus, in the loading mechanism of the present embodiment, consideration has been given to the helix angle of the worm gear 30 to enable manual inward and outward transportation. Specifically, the helix angle of the worm gear 30 is designed to be between 50 degrees and 80 degrees to enable the driving force to be transmitted from the wheel gear 27 to the worm gear 30. If the helix angle is less than 50 degrees, it is not possible to achieve an inter-gear reduction ratio, and conversely, if the helix angle is greater than 80 degrees, the driving force vector in the radial direction of the worm gear 30 shaft becomes large. In the range from 50 degrees to 80 degrees, the driving force vector in the thrust direction of a shaft of the worm gear 30 is large, and therefore smooth drive transmission is possible.

Figure 3A:
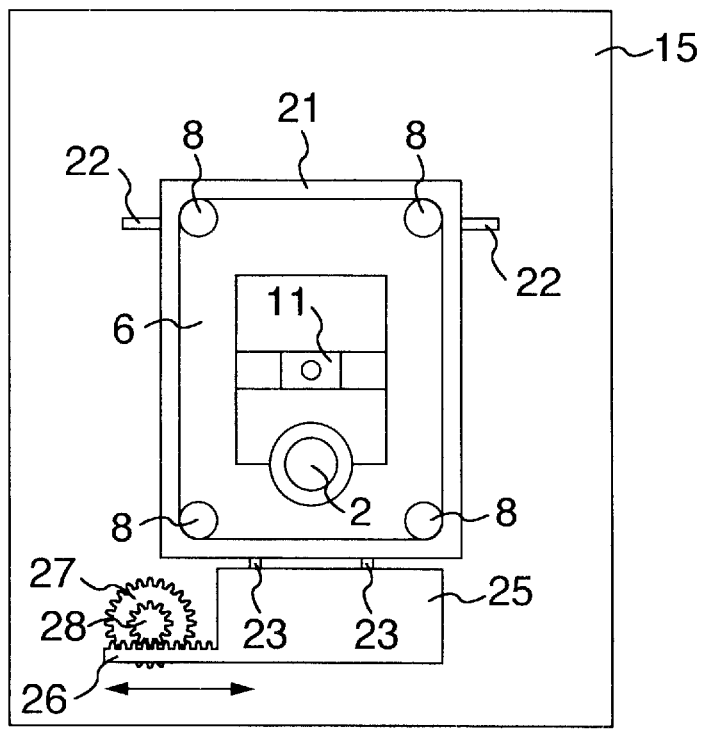
FIG. 3A is a top view explaining the vertical raising and lowering operations of a head member including a head by means of the disk loading mechanism of the present invention.
Figure 3B:
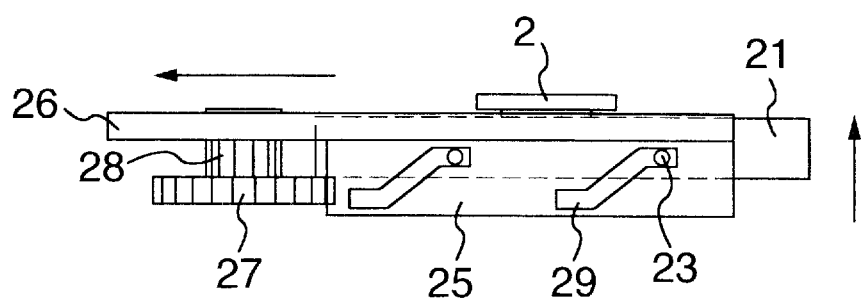
FIG. 3B is a side view showing a movable entity in a raised position.

FIG. 3 and FIG. 4 are drawings for explanation of the operations by the disk loading mechanism, which is an embodiment of the present invention, for raising and lowering the movable entity comprising the optical head 11 that reproduces or records and reproduces information of the disk 1, the spindle motor 2, the unit mechanism chassis 6, and a unit holder 21. FIG. 3A is a top view, FIG. 3B is a side view from the front of the apparatus (a front panel 12 side) showing the above described movable entity including an optical head 11 in the raised provided on a mechanism base 15. The use of this configuration is intended to reduce the number of parts, such as screws, used heretofore. A worm gear 30 is attached to the rotary shaft of the loading motor 24. The rotary driving force of the worm gear 30 is transmitted to a first wheel gear 27. A second wheel gear 28 is fixed to the rotary shaft of the first wheel gear 27.

Figure 3C:
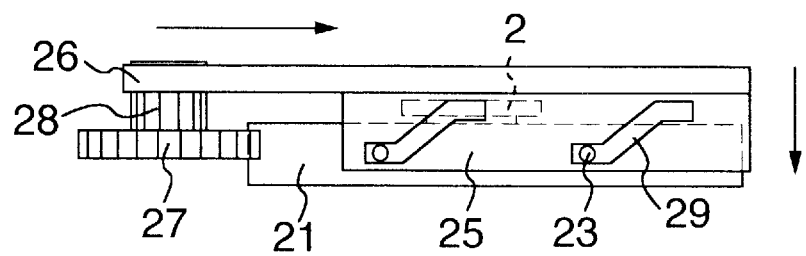
FIG. 3C is a side view showing a movable entity in a lowered position.
Figure 4A:
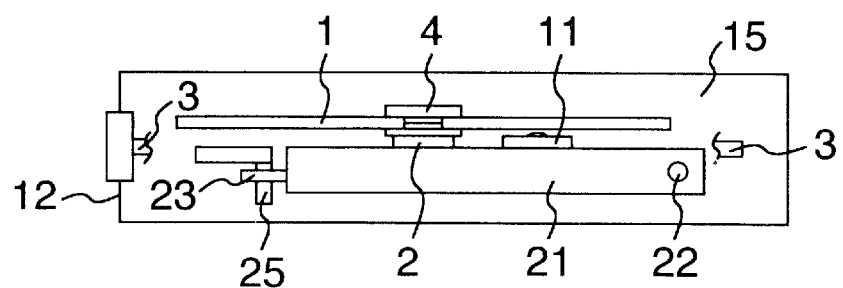
FIG. 4A is a view explaining the up-and-down moving operations of the head member including the head by means of the disk loading mechanism of the present invention (view showing the movable entity in the raised position)
Figure 4B:
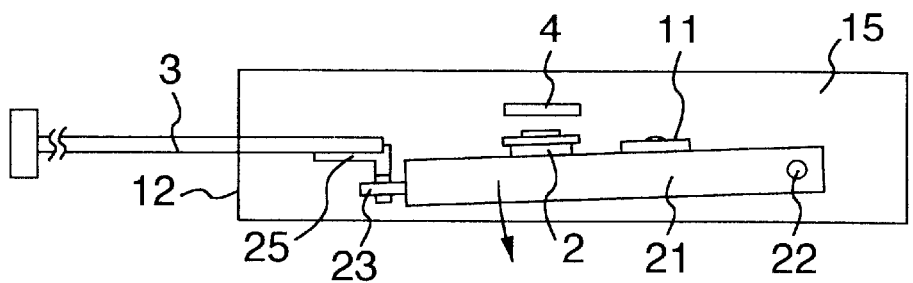
FIG. 4B is a view showing the state at the start of loading.

The disk tray 3 has a section of a rectilinear tray rack 32 provided in the direction of inward and outward transportation (shown by a two-headed arrow in the drawing), and the configuration is such that the tray rack 32 and the second wheel gear 28 mesh with each other. Thus, the disk tray 3 can be moved in the directions of inward and outward transportation of the disk 1 by rotating the loading motor 24. Incidentally, the disk drive apparatus requires an emergency eject function for the disk 1. That is, a function for manual inward and outward transportation (insertion and ejection) of the disk 1 is essential. Generally, in drive transmission using the worm gear 30, driving force transmission from the worm gear 30 to the wheel gear 27 is the principal operation. Consequently, transmission from the wheel gear 27 to the worm gear 30 is not normally possible. Therefore, since motive power cannot be transmitted from the wheel gear 27 to the worm gear 30, if an attempt is made to move the disk tray 3 manually in order to perform the manual inward and position (the state in which the disk 1 is housed inside the apparatus and disk 1 playback is possible), and FIG. 3C is a side view from the front of the apparatus (the front panel 12 side) showing the above described movable entity including the optical head 11 in the lowered position (the state in which the disk 1 has been removed from the apparatus). FIG. 4A is a side view from the right of the apparatus showing the above described movable entity including the optical head 11 in the raised position (the state in which the disk 1 is housed inside the apparatus and made reproducing of the disk 1 possible), and FIG. 4B is a side view from the right of the apparatus showing the above described movable entity including the optical head 11 in the lowered position (the state in which the disk 1 has been removed from the apparatus).

The optical head 11 is attached to the unit mechanism chassis 6 in such a way that it can move in the radial direction of the disk 1, and the spindle motor 2 is attached by means of fixing screws. The unit mechanism chassis 6 provides elastic support of a unit holder 21 by means of insulators 8a to 8d installed at the four corners. The unit holder 21 is provided with a rotary shaft 22, and a boss 23 at two places at the front of the unit holder 21. By applying a driving force for vertical raising or lowering to a portion of the boss 23, the unit holder 21 is rotated with the rotary shaft 22 as the axis of rotation.

The driving force of the loading motor 24 described in FIG. 2 is used as the driving force for vertical raising or lowering applied to the portion of the boss 23. The first wheel gear 27 is rotated by means of the loading motor 24 and the worm gear 30 attached to its rotary shaft. By this means, the second wheel gear 28 formed as an integral part is also similarly rotated. A slide plate 25 for driving force transmission is provided between the portion of the boss 23 of the unit holder 21 and the second wheel gear 28. As shown in FIG. 3B and FIG. 3C, the slide plate 25 is provided with sliding slots for vertical movement 29 to transmit force to the bosses 23 provided on the unit holder 21 and move it up and down. Also, the slide plate 25 is provided with the portion of the rack 26 shown in FIG. 3A for driving force transmission from the second wheel gear 28. The rotation of the second wheel gear 28 is received by the rack 26 part, and the slide plate 25 moves in the directions (left and right) indicated by an arrow in the drawing. Together with this, the boss 23 parts of the unit holder 21 move along the above described sliding slots for vertical movement 29. Consequently, the unit holder 21 moves up and down with the rotary shaft 22 as the center.

Figure 5:
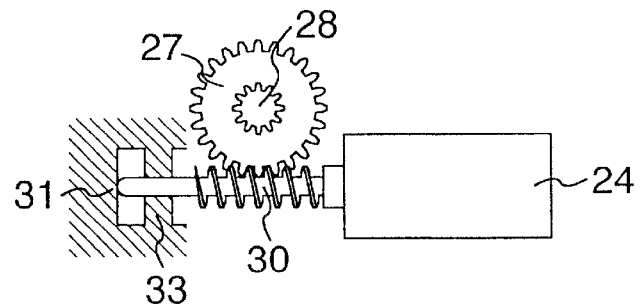
FIG. 5 is a view explaining play between the worm gear attached to the loading motor shaft and the wheel gear provided on a separate structure, and whirling of the above described motor shaft.

FIG. 5 shows the general configuration whereby the worm gear 30 is attached to the rotary shaft of the loading motor 24, and driving force transmission from this worm gear 30 to the wheel gear 27 is performed. The periphery of the rotary shaft of the loading motor 24 is supported by a fixed member 33 fitted to the base part in order to control major whirling, and the tip is received by a flat shaft tip bearing part 31. At this time, a gap is provided between the rotary shaft and the fixed member 33 so that a rotational load will not be applied during loading motor drive. There is always backlash in the meshing of gears. Also, with this kind of configuration, although major whirling of the rotary shaft can be controlled by means of the fixed member 33, it is not possible to suppress a minute degree of shaft whirling caused by slippage between the flat shaft tip bearing surface 31 and the tip of the rotary shaft. For this reason, a minute degree of shaft whirling occurs apart from worm gear 30 backlash, and contact noise is generated between the worm gear 30 and the wheel gear 27.

As whirling of the worm gear 30 shaft increases the bearing contact pressure inside the loading motor 24, problems with the life of the motor also arise. Moreover, problems also arise concerning friction and wear between the tip of the worm gear 30 and the shaft tip bearing surface 31 or the fixed member 33. Although not shown in the drawing, similar problems also arise between the wheel gears 27 and 28 and racks of other component parts.

The anti-whirling mechanism of the present invention will now be described with reference to FIG. 6. FIG. 6 shows an embodiment in which a means is provided for controlling whirling of the worm gear 30 attached to the loading motor 24.

Figure 6A:
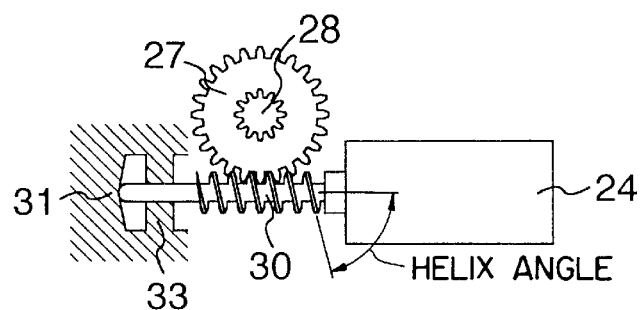
FIG. 6A is a view showing an embodiment of a mechanism that controls whirling of a motor shaft.

The configuration of the loading motor 24, the worm gear 30 attached to the rotary shaft, and the wheel gears 27 and 28 is the same as the configuration described in FIG. 5. In FIG. 6A, the shaft tip bearing part 31 that receives the tip of the worm gear 30 attached to the rotary shaft of the loading motor 24 has a V-groove shape, and the tip of the shaft is also processed to conform to this shape. This V-groove should be provided in the direction in which worm gear 30 shaft whirling is to be controlled with respect to the direction of contact of the first wheel gear 27 and the worm gear 30. This has the object of reducing the contact noise between the above described worm gear 30 and wheel gear 27, and is for the purpose of controlling this contact direction. It goes without saying that it is also possible to make the above described shaft tip bearing surface 31 and the tip of rotary shaft of the worm gear 30 semicircular in shape, and correspondingly make the bearing surface side a conical groove. In this case, whirling can be controlled over the circumference of the shaft.

Figure 6B:
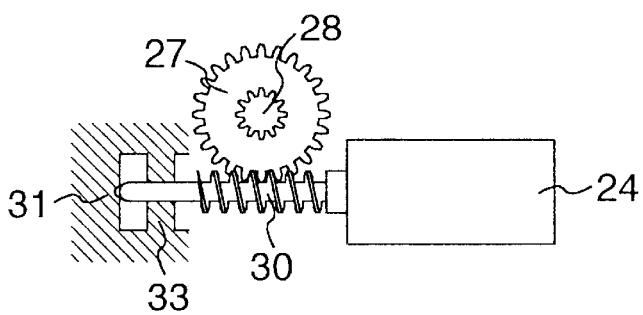
FIG. 6B is a view showing another embodiment of the mechanism that controls whirling of the motor shaft.

FIG. 6B shows another sample embodiment of the shape of the shaft tip bearing surface 31. This is configured so that the tip of the rotary shaft of the loading motor 24 is pressed into a groove or hole provided in the shaft tip bearing surface 31. In this case, whirling of the shaft of the worm gear 30 can be controlled by means of the above described groove or hole. Of course, it is also possible for the above described groove or hole to be of straight-through type, taking account of the precision and processability of the parts.

Figure 6C:
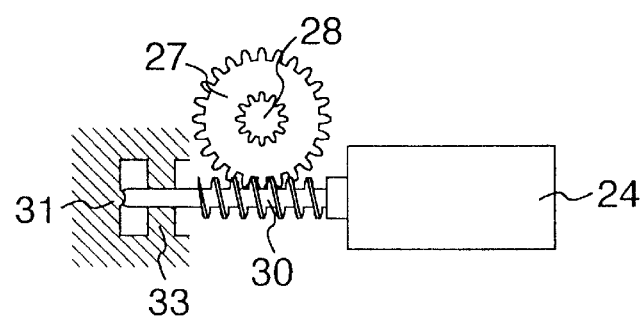
FIG. 6C is a view showing an embodiment of the mechanism that controls whirling of the motor shaft.

FIG. 6C shows another sample embodiment of the shape of the shaft tip bearing surface 31. A groove or hole is provided in the tip of the rotary shaft of the loading motor 24, and a projection is provided on the shaft tip bearing surface 31. In this case, whirling of the shaft of the worm gear 30 can be controlled by means of a configuration whereby this projection is made to match the groove or hole provided in the tip of the rotary shaft. With regard to the projection provided on the shaft tip bearing surface 31, processability is extremely good in case of a formed type. It is thus possible to alleviate the contact of the worm gear 30 and the wheel gear 27, and reduce the contact noise, by controlling whirling of the shaft of the worm gear 30 attached to the loading motor 24. Moreover, as a result of this, it is also possible to prevent damage due to contact of the gears. In addition, since bearing support is provided for the rotary shaft of the loading motor 24, controlling whirling of the shaft stabilizes the contact state of the above described shaft and bearing, resulting in improved life of the motor 24. By using the disk loading mechanism described above, it is possible to eliminate problems during loading and to provide a highly reliable disk drive apparatus.

In the embodiments described above, examples have been described in which a worm gear is attached to the loading motor shaft. However, although the configuration is slightly more complex, even if a bevel gear or spur gear is attached instead of a worm gear, whirling of the gear section in particular of the rotary shaft can be similarly reduced by using the structure in the above described sample embodiments for the part supporting the end of the motor shaft.

In accordance with the present invention, it is possible to provide a simple disk loading mechanism, at low cost and with few parts, that performs the two operations of driving the disk tray in the disk transportation direction by means of a loading motor with a worm gear attached, via a first wheel gear and a second wheel gear, and also vertically raising and lowering the unit mechanism via a slide plate. In addition, by optimization of the helix angle of the worm gear, it is possible to perform driving force transmission from the worm gear to the wheel gear, or to perform driving force transmission from the wheel gear to the worm gear, with the result that manual insertion and extraction of a disk, which is indispensable for a disk drive apparatus, has become possible in a system using a worm gear. Further, since means for controlling whirling of the shaft of the worm gear attached to the loading motor is provided, contact noise between the gears and clutch is reduced, and as a result damage due to contact of the gears can also be prevented. Still further, since bearing support is provided for the rotary shaft of the loading motor, controlling whirling of the shaft stabilizes the contact state of the above described shaft and bearing, resulting in improved motor life. The reliability of the disk drive apparatus is improved, and it is possible to provide a high-grade disk drive apparatus.

What is claimed is:

1. A disk drive apparatus for performing disk tray inward and outward transportation and disk loading operations by means of a rotary drive motor and a drive gear provided on the rotary shaft of said drive motor, and transmission gears for transmitting the rotary force from said drive gear;

wherein a rack is provided on said disk tray, a control mechanism is provided for controlling whirling of the rotary shaft of said drive motor, and said transmission gears comprise a first wheel gear coupled to the drive gear, and a second wheel gear that transmits a power to said rack; and wherein with regard to said control mechanism that controls whirling of said rotary shaft, a tip of said rotary shaft is of virtually semicircular shape, and a supporting portion for supporting the tip of said rotary shaft on a side of a structure that supports the rotary shaft of said rotary drive motor is formed in a V-groove shape or conical groove shape with respect to a center of rotation of said gear.

2. A disk drive apparatus for performing disk tray inward and outward transportation and disk loading operations by means of a rotary drive motor and a drive gear provided on the rotary shaft of said drive motor, and transmission gears for transmitting the rotary force from said drive gear;

wherein a rack is provided on said disk tray, a control mechanism is provided for controlling whirling of the rotary shaft of said drive motor, and said transmission gears comprise a first wheel gear coupled to the drive gear, and a second wheel gear that transmits a power to said rack; and wherein said control mechanism has a tip of said rotary shaft made a shape of a depression, and a shape thereof at a side of a structure that supports said rotary shaft tip is made a shape of a projection that virtually conforms to the shape of said depression.

3. A disk drive apparatus for performing disk tray inward and outward transportation and disk loading operations by means of a rotary drive motor and a drive gear provided on a rotary shaft of said drive motor, and transmission gears that transmit a rotary force from said drive gear;

wherein a rack is provided on said disk tray, a control mechanism is provided for controlling whirling of the rotary shaft of said drive motor, and said transmission gears comprise a first wheel gear coupled to the drive gear, and a second wheel gear for transmitting a power to said rack;

wherein a rotary shaft is provided on a unit holder for effecting up-and-down movement, from said second wheel gear via a slide plate, of a movable entity comprising an optical head that performs reproducing or recording and reproducing of disk information, a spindle motor, a unit mechanism chassis, and said unit holder; and wherein with regard to said control mechanism for controlling whirling of said rotary shaft, a tip of said rotary shaft is of virtually semicircular shape, and a supporting portion for supporting the tip of said rotary shaft on the side of the structure that supports the rotary shaft of said rotary drive motor is formed in a V-groove shape or conical groove shape with respect to a center of rotation of said gear.

4. A disk drive apparatus for performing disk tray inward and outward transportation and disk loading operations by means of a rotary drive motor and a drive gear provided on the rotary shaft of said drive motor, and transmission gears for transmitting the rotary force from said drive gear;

wherein a rack is provided on said disk tray, a control mechanism is provided for controlling whirling of the rotary shaft of said drive motor, and said transmission gears comprise a first wheel gear coupled to the drive gear, and a second wheel gear that transmits a power to said rack;

wherein the rotary shaft is oriented at an acute angle with respect to the rack such that an end of the rotary shaft furthest away from the rack is further inside the disk drive apparatus in a direction of inward transportation of the disk tray than an end of the rotary shaft closest to the rack; and wherein the first wheel gear is further inside the disk drive apparatus in the direction of inward transportation of the disk tray than the rotary shaft.

5. A disk drive apparatus for performing disk tray inward and outward transportation and disk loading operations by means of a rotary drive motor and a drive gear provided on a rotary shaft of said drive motor, and transmission gears that transmit a rotary force from said drive gear;

wherein a rack is provided on said disk tray, a control mechanism is provided for controlling whirling of the rotary shaft of said drive motor, and said transmission gears comprise a first wheel gear coupled to the drive gear, and a second wheel gear for transmitting a power to said rack;

wherein a rotary shaft is provided on a unit holder for effecting up-and-down movement, from said second wheel gear via a slide plate, of a movable entity comprising an optical head that performs reproducing or recording and reproducing of disk information, a spindle motor, a unit mechanism chassis, and said unit holder;

wherein the rotary shaft is oriented at an acute angle with respect to the rack such that an end of the rotary shaft furthest away from the rack is further inside the disk drive apparatus in a direction of inward transportation of the disk tray than an end of the rotary shaft closest to the rack; and wherein the first wheel gear is further inside the disk drive apparatus in the direction of inward transportation of the disk tray than the rotary shaft.

* * * * *